United States Patent
Essenmacher et al.

(10) Patent No.: US 8,095,604 B2
(45) Date of Patent: Jan. 10, 2012

(54) AUTOMATICALLY MODIFYING DISTRIBUTED COMMUNICATIONS

(75) Inventors: Michael D. Essenmacher, Red Hook, NY (US); James M. Hertzig, Tillson, NY (US); Thomas E. Murphy, Jr., Hopewell Junction, NY (US); Francis A. Pflug, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 12/134,248

(22) Filed: Jun. 6, 2008

(65) Prior Publication Data
US 2009/0307317 A1 Dec. 10, 2009

(51) Int. Cl.
*G06F 15/16* (2006.01)
(52) U.S. Cl. ........ 709/206; 709/223; 709/245; 709/246; 715/752
(58) Field of Classification Search ............. 709/206, 709/245, 246, 223; 715/752
See application file for complete search history.

(56) References Cited

U.S. PATENT DOCUMENTS

| | | | |
|---|---|---|---|
| 6,564,264 B1 | 5/2003 | Creswell et al. | |
| 6,684,238 B1 | 1/2004 | Dutta | |
| 7,337,448 B1 | 2/2008 | Dalia et al. | |
| 7,430,580 B2 * | 9/2008 | Baratakke et al. | 709/206 |
| 2002/0023181 A1 | 2/2002 | Brown et al. | |
| 2002/0042815 A1 | 4/2002 | Salzfass et al. | |
| 2002/0087647 A1 | 7/2002 | Quine et al. | |
| 2002/0143879 A1 | 10/2002 | Sommerer | |
| 2002/0188683 A1 | 12/2002 | Lytle et al. | |
| 2003/0110223 A1 | 6/2003 | Hamilton et al. | |
| 2003/0135567 A1 | 7/2003 | Reilly | |
| 2004/0181586 A1 * | 9/2004 | Morreale et al. | 709/206 |
| 2004/0215726 A1 | 10/2004 | Arning et al. | |
| 2004/0249951 A1 | 12/2004 | Grabelsky et al. | |
| 2005/0278430 A1 | 12/2005 | Cato | |
| 2006/0031772 A1 * | 2/2006 | Valeski | 715/751 |
| 2007/0050456 A1 * | 3/2007 | Vuong et al. | 709/206 |
| 2007/0106731 A1 | 5/2007 | Bhakta et al. | |
| 2007/0124394 A1 | 5/2007 | Farrell et al. | |
| 2008/0021962 A1 * | 1/2008 | Ryan et al. | 709/206 |
| 2008/0040432 A1 | 2/2008 | Murphy et al. | |
| 2008/0071867 A1 * | 3/2008 | Pearson et al. | 709/206 |
| 2008/0104075 A1 * | 5/2008 | Heumesser | 707/7 |
| 2008/0104190 A1 * | 5/2008 | Morreale et al. | 709/206 |
| 2008/0133677 A1 * | 6/2008 | Pattabhiraman et al. | 709/206 |
| 2008/0168373 A1 * | 7/2008 | Wilson | 715/769 |
| 2008/0301454 A1 * | 12/2008 | Malcolm et al. | 713/176 |
| 2009/0089382 A1 * | 4/2009 | Garrett | 709/206 |

(Continued)

OTHER PUBLICATIONS

Network Working Group Request for Comments 2822, P. Resnick, Apr. 2001.

(Continued)

*Primary Examiner* — Oanh Duong
(74) *Attorney, Agent, or Firm* — William A Kinnaman; Kevin P. Radigan, Esq.; Heslin Rothenberg Farley & Mesiti P.C.

(57) ABSTRACT

Modifications are made to communications that have been distributed to one or more recipients. These modifications include at least one of adding a new recipient to the communication, deleting one or more recipients from the communication or moving one or more recipients from one or more of the fields of the communication to one or more other fields. These modifications may be performed automatically and/or transparently for the existing recipients.

17 Claims, 6 Drawing Sheets

500

502 — Resent-From: Joe Public<jpublic@charter.net>
504 — Resent-To: Mary Smith <mary@example.net>, Jack Smith <jack@example.net>, John Brown <jbrown@nowheres.org>
506 — Resent-Date: Mon, 24 Nov 1997 14:22:01 -0800
      Resent-Message-ID: <78910@example.net>
508 — X-AddToCC-List: <murphyte@us.ibm.com, pflugfa@us.ibm.com>
510 — From: Joe Public <jpublic@charter.net>
      To: Mary Smith <mary@example.net>, Jack Smith <jack@example.net>, John Brown <jbrown@nowheres.org>
      Subject: ADDcc: New Security Exploit
      Date: Fri, 21 Nov 1997 09:55:06 -0600
512 — Message-ID: <1234@local.machine.example>

U.S. PATENT DOCUMENTS

2009/0094335 A1* 4/2009 Edmonds et al. ............. 709/206
2009/0132664 A1* 5/2009 Radenkovic et al. ......... 709/206
2009/0182824 A1* 7/2009 Haynes et al. ................ 709/206
2009/0240657 A1* 9/2009 Grigsby et al. ................... 707/3

OTHER PUBLICATIONS

Moore, K., G. Vaudreuil, Network Working Group Request for Comments 3464, Jan. 2003.
Office Action for U.S. Appl. No. 12/134,246 dated May 10, 2010.
Office Action for U.S. Appl. No. 12/134,242 dated May 4, 2010.
Final Office Action for U.S. Appl. No. 12/134,246 dated Oct. 25, 2010.
Final Office Action for U.S. Appl. No. 12/134,242 dated Oct. 13, 2010.
Office Action for U.S. Appl. No. 12/134,238 dated Jun. 6, 2008.
Final Office Action for U.S. Appl. No. 12/134,238 dated Mar. 3, 2011.

* cited by examiner

202 — To: Mary Smith <mary@example.net>, Jack Smith<jack@example.net>, John Brown<jbrown@nowheres.org>

204 — cc: John Doe<doej@example.net>, Lisa Riley<lriley@somewhere.org>, Fred Blue<fblue@example.net>, Steve Wolf<swolf@anywhere.net>

206 — bcc:

208 — Subject: New Security Exploit

210 — Body of Message

500

502 — Resent-From: Joe Public<jpublic@charter.net>
504 — Resent-To: Mary Smith <mary@example.net>, Jack Smith <jack@example.net>, John Brown <jbrown@nowheres.org>
506 — Resent-Date: Mon, 24 Nov 1997 14:22:01 -0800
Resent-Message-ID: <78910@example.net>
508 — X-AddToCC-List: <murphyte@us.ibm.com, pflugfa@us.ibm.com>
510 — From: Joe Public <jpublic@charter.net>
To: Mary Smith <mary@example.net>, Jack Smith <jack@example.net>, John Brown <jbrown@nowheres.org>
Subject: ADDcc: New Security Exploit
Date: Fri, 21 Nov 1997 09:55:06 -0600
512 — Message-ID: <1234@local.machine.example>

FIG. 5

AUTOMATICALLY MODIFYING DISTRIBUTED COMMUNICATIONS

TECHNICAL FIELD

This invention relates, in general, to communications distributed to recipients, and in particular, to automatically modifying information of a distributed communication.

BACKGROUND OF THE INVENTION

There are various modes of communication used today, including telephonic communication, facsimile communication, and electronic communication, as examples. In recent years, electronic communication has become a preferred medium of communication for many businesses and individuals. Electronic communication includes electronic mail, also known as email or e-mail, and instant messaging, as examples. The preference for electronic communication stems from the many advantages that are provided by this mode of communication. People have always wanted to correspond with one another in the fastest way possible. Electronic mail is advantageous over regular mail in this respect as it provides a near instantaneous form of communication. Prior to e-mail, first telegraph, and then later facsimile, provided similar instantaneous forms of communication, but in both cases, the steps leading to sending and then ultimately steps involved in receiving this instant communication were burdensome. By contrast, once means of communication are established, electronic mail or other electronic communications do not provide any additional burdens either for the sender sending the communication or the receiver receiving the communication.

The popularity of electronic communication has led both individuals and businesses to rely heavily on this form of communication. Electronic communication allows people to write back and forth without having to spend much time worrying about how the message actually gets delivered. As technology grows closer and closer to being a common part of daily life, the reliance of both individuals and businesses on this medium of communication is sharply increasing.

One common problem encountered when collaborating with people using electronic mail is keeping the correct (interested) entities (e.g., people, parties, etc.) in the distribution chain for a particular thread of e-mails. As new participants are brought on-board, there is a need to add additional interested entities into the discussion or thread of the e-mail. Similarly, occasionally, an entity is no longer interested, and therefore, there is a need to delete that entity from the distribution chain.

One way to add an entity is to take roundabout steps to make sure the actively shared distribution list associated with the thread has been updated to include the new entity. Today, this is typically accomplished by burdening the existing recipients to receive a resend of the previously delivered e-mail with the additional entity. This effects an implicit change to the active list of participant's, such that the additional entity will implicitly be included in subsequent reply/all or forward/all dialogues among the active participants. In this scenario, it is imperative that the active participants be conscious to use the most recent thread of the e-mail in order to include the new entity. This nuts and bolts approach is very cumbersome and prone to human error and oversight.

Moreover, every time an e-mail arrives in someone's inbox, it generally is assumed to represent meaningful correspondence intended for processing. Thus, all the participants must process the most recent updates in the form of reading each e-mail where an entity is added to the thread. In the scenario in question in which the e-mail was sent for the simple administrative purpose of adding an interested entity, the sent e-mail is very misleading and draws unwarranted attention from an otherwise busy recipient that has already processed the substantive content of the note in a previous delivery of the mail.

SUMMARY OF THE INVENTION

Based on the foregoing, a need exists for a capability to facilitate the modifying of information, including the recipients, of a distributed communication. In particular, a need exists for an automatic, less cumbersome approach to modifying a recipient list (e.g., in the To:, cc: and/or bcc: fields) of a distributed communication.

The shortcomings of the prior art are overcome and additional advantages are provided through the provision of a computer-implemented method of facilitating modification of communications distributed in a communications environment. The method includes, for instance, determining that a recipient list of a communication electronically provided to one or more recipients of the recipient list is to be modified; and automatically initiating modification of the recipient list included in the provided communication, in response to the determining, wherein the modification is to be absent a resend of the complete communication.

Systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 depicts one example of a communication including an addition to a cc: header, in accordance with an aspect of the present invention.

DETAILED DESCRIPTION OF THE INVENTION

In accordance with an aspect of the present invention, a capability is provided for automatically modifying a recipient list of a distributed communication. As used herein, a recipient list includes the one or more recipients indicated in a communication. For example, the recipient list includes recipients indicated in the To:, cc: and/or bcc: fields of a header, or any other fields of a communication.

As an example, a recipient may be added to the To:, cc: or bcc: fields of an e-mail that has already been distributed to the recipients designated in the e-mail. As another example, a recipient may be deleted from the To:, cc: or bcc: fields of the distributed e-mail. As yet a further example, a designated recipient may be moved from one field to another field of the e-mail header (e.g., from bcc: to cc:; from cc: or bcc: to the To: field; from To: to cc: or bcc:; etc.), subsequent to e-mail distribution.

The modifications are performed, in one example, transparently and/or seamlessly to the recipients that previously received the communication. For instance, when collaborating with people using e-mail, it is often desirable that any new participants of the collaboration be brought up-to-speed and/or on-board for a particular thread of e-mails. It is also desirable that the connecting into a dynamic thread of e-mail be performed with little or no impact to the existing participants.

Figure 1:
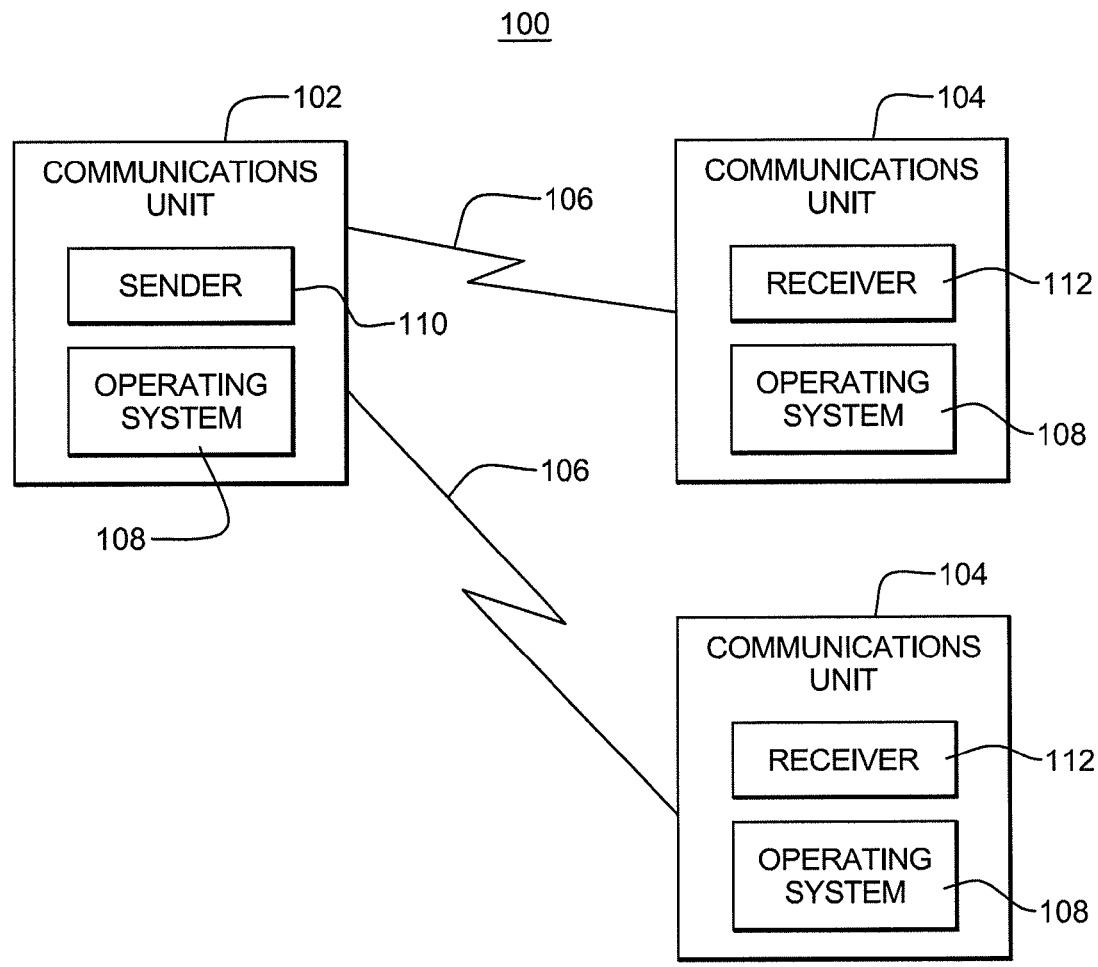
FIG. 1 depicts one example of a communications environment to incorporate and use one or more aspects of the present invention.

One embodiment of a communications environment to incorporate and use one or more aspects of the present invention is described with reference to FIG. 1. A communications environment 100 may include, for instance, a communications unit 102 coupled to a plurality of other communications units 104 via one or more connections 106. A communications unit may include, for instance, a personal computer, a laptop, a handheld unit, a workstation, a mainframe, a mini computer, a node or any other type of unit capable of sending and/or receiving e-mails or other communications. Communications unit 102 may or may not be the same type of communications unit as communications units 104. Additionally, each of communications units 104 may or may not be the same type of unit as another communications unit 104. The connections coupling the units are, for instance, any type of network connection, such as an internet connection, a local area network (LAN); a wide area network (WAN); a token ring; an Ethernet connection, etc.

Each communications unit 102, 104 executes, for example, an operating system 108, such as, for instance, AIX®, offered by International Business Machines Corporation, Armonk, N.Y.; Linux; Windows®; or other operating systems, etc. (AIX® and IBM® are registered trademarks of International Business Machines Corporation, Armonk, N.Y., U.S.A. Windows® is a registered trademark of Microsoft Corporation, Redmond, Wash. Other names used herein may be registered trademarks, trademarks or product names of International Business Machines Corporation or other companies.) The operating system of one communications unit may be the same or different from another communications unit. Further, in other examples, one or more of the communications units may not include an operating system. Although three (3) communications units are depicted in FIG. 1, more or less units may be included. In one example, communications unit 102 is communicatively coupled to a number of communications units.

Communications unit 102 includes, for instance, a sender 110, which sends communications to one or more communications units 104. In this example, each of communications units 104 includes a receiver 112 that receives and may respond to the communications received from sender 110.

To communicate between a sender and a receiver, the sender prepares a communication (e.g., a note, a message, etc.) to be sent to the receiver. In one example, the messages are sent between users within the framework of an electronic communication, and a syntax is provided for the messages. One example of such a syntax is provided by the network working group request for comments (RFC) 2822 document, hereinafter RFC2822, from Qualcomm Inc., published April 2001, which is hereby incorporated herein by reference in its entirety.

In the context of electronic mail, RFC2822 messages are viewed as having an envelope and contents. The envelope includes whatever information is needed to accomplish transmission and delivery. The contents include the object to be delivered to the recipient. The above mentioned standard effects the format and some of the symantics of message content, but does not contain any information pertaining to the envelope. Under this standard, messages are passed by the help of header fields which have similar structures and are composed of a field name separated from a field body by a colon.

Figure 2:
FIG. 2 depicts one example of a communication to be sent to a plurality of receivers, in accordance with an aspect of the present invention.

One example of a communication is depicted in FIG. 2. In this example, a communication 200 is an e-mail communication that includes a plurality of header fields, including, for instance, a To: field 202 indicating one or more identities of one or more recipients to which the communication is to be sent (e.g., addresses, buddy indications, phone numbers, or any type of information that indicates where a communication is to be sent or otherwise identifies how to locate a user); a cc: field 204 indicating zero or more recipients that are to be carbon copied; a bcc: field 206 indicating zero or more recipients that are to be blind carbon copied; and a subject field 208, optionally indicating the subject. The communication also includes a message 210. A communication may include more, less or different information than described above. Further, although an e-mail communication is described herein as an example, other forms of communication can be sent and benefit from one or more aspects of the present invention.

In preparing an e-mail communication, the sender includes, for instance, a designation of one or more intended recipients in, for instance, the To:, cc:, and/or bcc: fields of the e-mail communication. In this example, the designation is a name and/or an e-mail address, but in other examples, it can be other than a name or e-mail address.

Subsequent to completing the communication, it is sent to the recipients indicated in the To:, cc:, and bcc: fields. Thereafter, it may be determined that one or more other recipients are to receive the communication and be included in further dialog relating to this communication (e.g., in reply all or forward all). As one example, new participants (i.e., entities) are added seamlessly (with no or low impact to existing participants) to the communication, and those new participants are inherently included in any future correspondence related to the particular thread of e-mail from that point on. As one example, the new participant is added in a particular context, so as to not mislead other participants in believing they may need to urgently open and read a pending e-mail only to find that someone was simply added to the participant list.

In accordance with an aspect of the present invention, additional participant(s) can be added into an existing communication thread through the architecture and selective distribution of an administrative record. This record is provided to the existing thread participants without necessarily requiring any manual intervention on the existing participants' part. The result being that any reply-all, forward-all, etc. actions or other ongoing dialogue will thereafter include the new participant's identifier (e.g., e-mail address, name, etc.), as being associated with the thread in question. A defined herein, the communication and other communications associated there-with, generated by, for instance, a reply-all or forward-all, are considered part of the same communication thread.

In one example, the administrative record is an informational header record, which appends the new participant's e-mail address (or other identifier) to an e-mail thread. This new (short) informational record is efficiently distributed to each of the existing participants in the e-mail thread in an administrative capacity without the burden of redistributing the original full e-mail and it's payload.

Optionally, depending on a recipient's client software user preferences or enterprise policy, the arrival of the distributed administrative record can be transparently handled and automatically processed without the awareness of the recipient; it can be automatically processed, but with awareness; or it can be handled with manual intervention upon arrival to a recipient's inbox. In those situations in which the recipient is to be aware, the administrative record may optionally be marked as admin unnecessarily drawing undue attention beyond it's intended context of simply indicating a modification to the recipient list.

In accordance with an aspect of the present invention, when the sender or receiver of a communication determines that one or more other entities are to be a part of the communication thread, steps are taken to add them, and optionally, inform the other participants. Further, in other embodiments, when it is determined that other modifications are to be made, steps are taken to make the modifications. One embodiment of the logic to prompt consideration of whether a recipient list is to be modified is described with reference to FIG. 3. Further, one embodiment of the logic to modify the recipient list, if desired, is described with reference to FIG. 4. In one example, it is an e-mail client that executes this logic. Further, in the examples described with reference to these figures, the communication is an e-mail. However, in other examples, the communication can be other than an e-mail.

Figure 3:
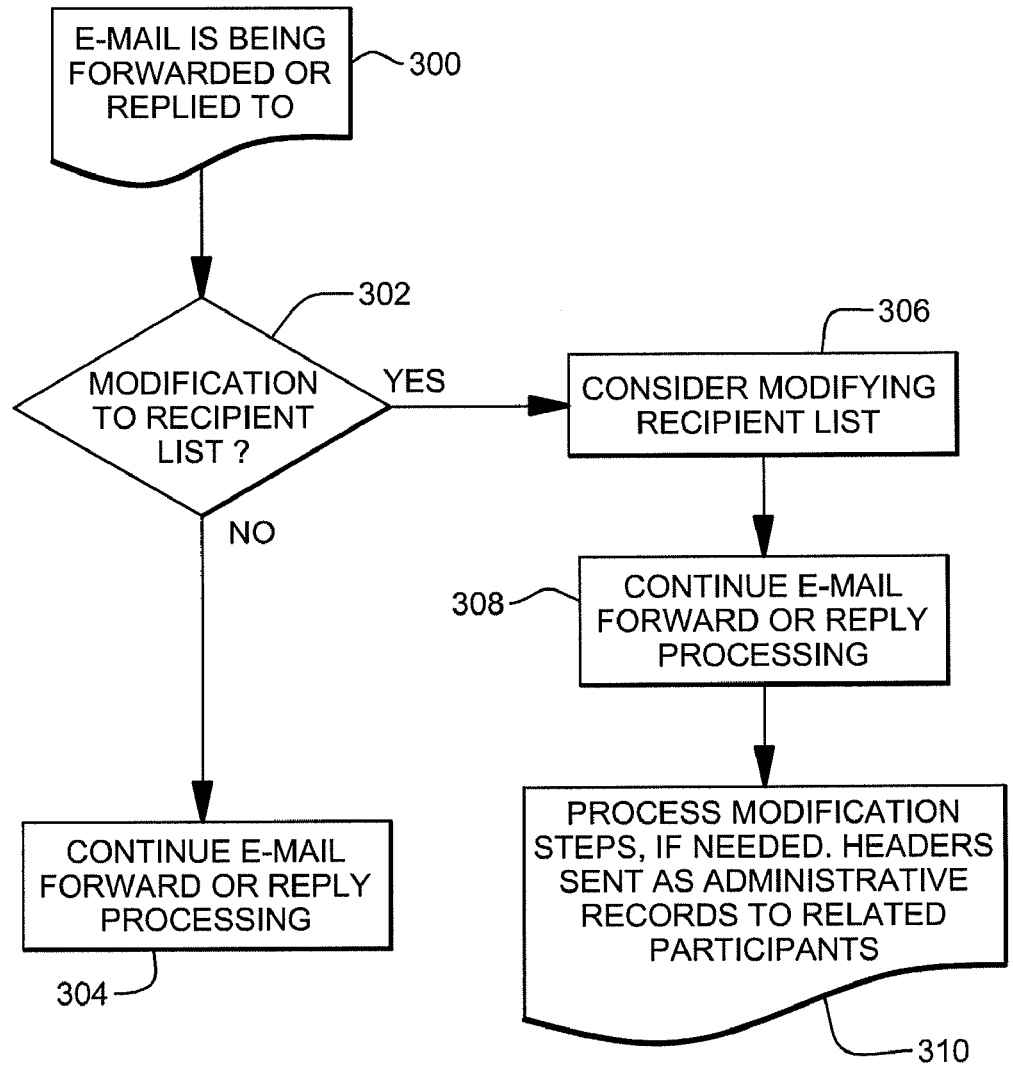
FIG. 3 depicts one embodiment of the logic prompting consideration of whether a recipient list of a distributed communication is to be modified, in accordance with an aspect of the present invention.

Referring to FIG. 3, in one example, a communication is being forwarded or replied to, STEP 300. The e-mail client performing the forwarding or replying determines if a modification is being made to the recipient list of the e-mail. For instance, is a new receiving entity being added to the distribution list, INQUIRY 302. As one example, this determination is made by comparing the recipients included in the forward or reply with a saved list of recipients. If no new modification is being made, then e-mail processing continues as normal, STEP 304.

However, if a modification is being made, INQUIRY 302, then consideration is given as to whether the distributed list of each existing recipient (or a subset thereof) is to be modified, STEP 306. One embodiment of this logic is described further below with reference to FIG. 4. Subsequent to determining whether the modification is to be propagated to the existing participants, the forwarding of or replying to the e-mail continues, in a standard manner, STEP 308. Further, if it is determined that the distribution lists of the existing recipients are to be modified, then steps are taken to perform the modification, STEP 310. As one example, administrative records, described below, are provided to the recipients as part of the e-mail delivery process.

Figure 4:
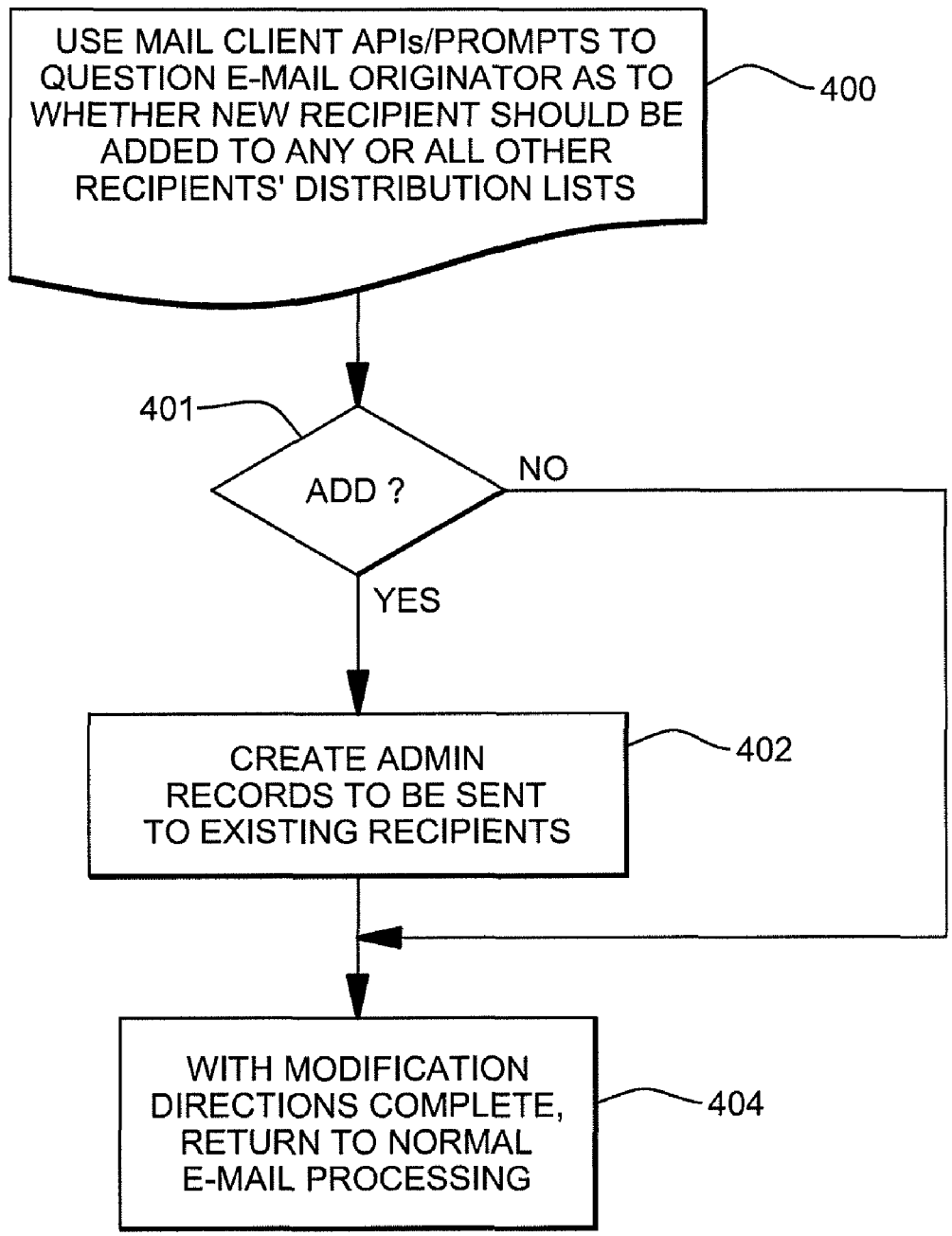
FIG. 4 depicts one embodiment of the logic to modify a recipient list of a distributed communication, if desired, in accordance with an aspect of the present invention.

Referring to FIG. 4, one embodiment of the logic to determine whether a modification is to be made to the existing recipients' distribution lists is described. In one particular example, logic is provided to determine if one or more new recipients are to be added to a recipient list of a distributed communication. As one example, this logic is automatically performed by the communications unit performing the forward all or reply all that includes the new recipient(s).

Initially, a dialog is opened between the e-mail client performing the forward or reply and the e-mail originator (e.g., the originator of the initial e-mail, now to be updated, if allowed; or another designated entity). The question is raised as to whether it is acceptable or desirable to update the distribution lists of the existing recipients to include the new recipient, STEP 400. If the e-mail originator responds indicating the update is unacceptable, INQUIRY 401, then processing continues, as normal, STEP 404. In this example, processing continues at STEP 308 of FIG. 3.

However, if the modification is acceptable, INQUIRY 401, then administrative records are created that are to be sent to the existing recipients to update their distribution lists, STEP 402. E-mail processing then continues, STEP 404. In this example, processing continues at STEP 308 of FIG. 3.

In one example, the record is created using a "roll your own" header record (introduced in RFC2822). A customized administrative header record is created that is sent to the entities listed in the forwarded e-mail and includes, for instance, the userid to be added to the associated (participant-context) distribution for the e-mail.

Examples of the record to be sent to each existing participant on the referenced e-mail thread are as follows:

Example of adding to a cc:

"X-AddToCC-List:      <murphyte@us.ibm.com, pflugfa@us.ibm.com>CrLf"

This administrative header line when received and processed by the existing participant's e-mail client updates the referenced e-mail's carbon copy list.

One example of a communication that includes this header is depicted in FIG. 5. As shown, in this particular example, a communication 500 is a resent communication having resent fields. Resent fields are used to identify a message as having been reintroduced into the transport system by a user and their purpose is to have the message appear to the final recipient as if it were sent directly by the original sender. A separate set of resent fields is added each time this is done. All of the resent fields corresponding to a particular resending of a message are lumped together. Each new set of resent fields is prepended to the message, such that the most recent set of resent fields appears earlier in the message. Each set of resent fields corresponds to a particular resending event, such that when a message is resent multiple times, each set of resent fields gives identifying information for each individual time.

There are different types of resent fields, such as, for example, the "Resent-Date:" field that corresponds to the "Date:" field and the "Resent-To:" field that corresponds to the "To:" field. In addition, there are two forms of originator fields associated with resent fields. The first is a "Resent-From:" form which contains the mailbox of the individual doing the resending. The second is identified in the "Resent-Sender:" field and resends a message on behalf of one or more others (identified in the "Resent-From:" field). When replying to a resent message, replies behave just as they would with any other message, using the original "From:","Reply-To:", "Message-ID:", and other fields. The "Resent-Date:" indicates the date and time at which the resent message is dispatched by the resender of the message. The "Resent-To:", "Resent-Cc:", and "Resent-Bcc:" fields function the same as the "To:", "Cc:", and "Bcc:" fields respectively, except that they indicate the recipients of the resent message, not the recipients of the original message. The "Resent-Message-ID:" field provides a unique identifier for the resent message.

In FIG. 5, communication 500 includes, for instance, a Resent-From field 502, a Resent-To field 504, a Resent-Date field 506 and a Resent-Message-Id field 508. Also, an X-Add-to-CC List field 510 is provided that identifies the new recipient(s) address(es) to be added to the e-mail thread. The resent lines connect the new note adding the new recipients to the original note. Further, a Message-Id field 512 is provided that uniquely identifies the original note.

To process this update, the User Agent (e.g., e-mail interface) searches its database for the original unique message identifier (resent in the updated communication) and uses it to perform the update (e.g., to automatically merge or to prompt for addition of the new recipient).

As further examples, other header lines may be used. For instance, "X-AddToPrimary-List", when received, updates the primary list of recipients (e.g., the To: field).

Further, this header line, "X-AddToBlind-List", when received, updates the list of recipients in the bcc: field.

The informational records are, in one example, provided to each recipient having a recipient list of one or more recipients to be updated, and each individual list is updated without explicit notification to the recipient. That is, in this example, the recipient does not see the record, but instead, the e-mail client (e.g., processor) of the recipient receives the record and processes it absent notification of the recipient (i.e., the user identified by the recipients' e-mail address does not see the record—it is transparent to the user).

As a further example, although the record is automatically processed for the recipient, the recipient still sees the record in its inbox. Thus, in one embodiment, the subject line may optionally be appended so as to properly set expectations of the recipient of the correspondence (while viewing their inbox) to know this is an administrative or informational record only. For instance, the record optionally includes a short informational subject indicator appended to the subject line, an example of which is below:

"Subject: Customer issue 123 concern; (ADDcc:)".

Optionally, a short informational message is included in the body of the e-mail, such as:

"Jan. 28, 2008, 17:45:31 EST: msmith@us.ibm.com added to cc: by jdoe@gmail.com".

In yet a further example, the entire e-mail is resent, and optionally, the subject line is marked (ADDcc:) and/or includes an informational message, as described above.

The administrative record may be automatically or manually processed, as reflected in site policy or the recipient user's preference settings. In automatic mode, the To:, cc: or bcc: fields may be updated transparently without any personal intervention directly in the inbox. Alternatively, they may be queued awaiting manual processing.

When each of the recipient's e-mail clients receives the administrative record, the new participant's userid, as an example, is appended as an addendum recipient to the original e-mail thread distribution list.

Consistent with RFC 2822, compliant e-mail client's are expected to ignore unrecognized records (such as this), should they not yet support this feature, therein avoiding adverse consequences when sent to an unsupported client.

Optionally, the receiving e-mail client may log the receipt of the informational record along with the pertinent information. E-mail clients may reflect the event and data within their rendering of the e-mail thread as an informational (or journal) entry with a timestamp, so as to record the event in the context of repudiation.

The effective result being that any reply-all or other ongoing dialogue will thereafter include the new participant's e-mail id as being associated with the thread in question.

Although in the example above, one or more new recipients are being added to a distribution list of each existing recipient of the communication, in other examples, one or more existing recipients may be removed from the lists and/or one or more recipients may be moved from one header field (e.g., To:, cc: or bcc:) to another header field (e.g., To:, cc: or bcc:). Similar logic and administrative records would be used to accomplish these tasks.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 6:
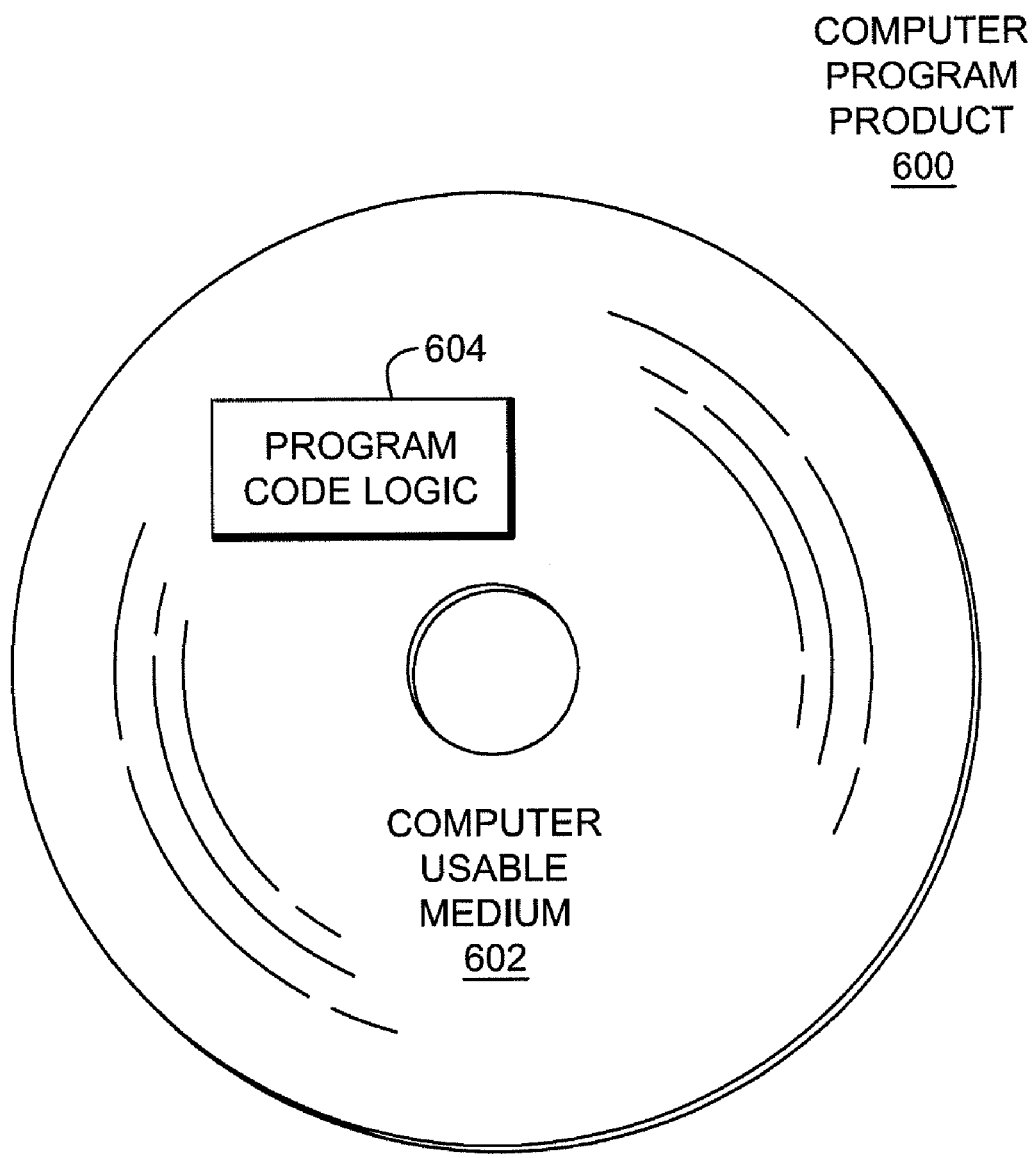
FIG. 6 depicts one embodiment of a computer program product incorporating one or more aspects of the present invention.

One example of an article of manufacture or a computer program product incorporating one or more aspects of the present invention is described with reference to FIG. 6. A computer program product 600 includes, for instance, one or more computer usable media 602 to store computer readable program code means or logic 604 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided to automatically, and optionally transparently, update a recipient list of an already distributed communication, such that further forward all or reply all communications include the modification. This capability enables the modification without requiring a resend of the entire e-mail or even a portion of the body of the e-mail.

Although examples are provided above, many revisions can be made without departing from the spirit of the present invention. For instance, STEPs 400 and 401 can be eliminated, and it can be assumed that the modification is to be made. Further, an explicit step may be added inquiring as to whether explicit notification is to be provided. Many other changes, additions and/or deletions are possible without departing from the sprit of the present invention.

An identity is any type of information that indicates where a communication is to be sent or otherwise identifies how to locate a user, including, but not limited to, an e-mail address, a buddy indication, an indication in a phone directory or other types of addresses used in communication.

As a further example, the communications environment described above is only one example. There can be more or less communication units than described above. Also, the units can be different than that described above. As one particular example, the communications unit to send or receive a communication may be a cell phone or other mobile device. Many other examples are also possible.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of facilitating modification of communications distributed in a communications environment, said method comprising:
   receiving by a processor an informational record to be used to modify a communication previously received by a recipient, the communication specifying a list of recipients that were previously sent the communication electronically, and the informational record specifying a change to be made to the list of recipients specified in the communication previously received by the recipient;
   responsive to receiving the informational record, the processor using a message identifier included in the informational record to identify the communication previously received by the recipient; and
   modifying by the processor the identified communication previously received by the recipient, the modifying changing in the communication previously received by the recipient the list of recipients specified in the communication previously received by the recipient,
   wherein the modifying comprises adding a recipient to the list of recipients, wherein the added recipient receives a further provision of the communication.

2. The method of claim 1, wherein the adding comprises including the recipient in at least one of a To: header, acc: header or a bee: header in the communication previously received by the recipient, subsequent to receipt of the communication.

3. The method of claim 1, wherein the modifying comprises deleting a recipient from the list of recipients.

4. The method of claim 1, wherein the modifying comprises moving a recipient from one header field in the communication previously received by the recipient to another header field in the communication previously received by the recipient.

5. The method of claim 1, wherein the modifying comprises modifying the list of recipients at each recipient of the list of recipients.

6. The method of claim 1, further comprising:
   creating the informational record indicating the modification;
   sending the informational record to the processor; and
   absent intervention by the recipient of the communication previously received by the recipient, automatically processing the informational record indicating the modification, the automatically processing comprising modifying at least one header field of the communication previously received by the recipient transparent to the recipient, wherein a subsequent reply-all, by the recipient to the communication previously received by the recipient, and subsequent to the automatic processing, automatically includes the modification.

7. The method of claim 1, wherein the informational record includes an X-field that identifies the modification to be performed.

8. The method of claim 1, further comprising notifying one or more recipients of the list of recipients of the modification.

9. The method of claim 1, wherein the communication comprises an e-mail, and wherein a reply to the modified communication or a forward of the modified communication by a recipient will automatically include the modified list of recipients with the reply or forwarded modified communication.

10. A computer system for facilitating modification of communications distributed in a communications environment, said computer system comprising:
    memory; and
    a processor in communications with the memory, wherein the computer system is configured to perform a method, said method comprising:
       receiving an informational record to be used to modify a communication previously received by a recipient, the communication specifying a list of recipients that were previously sent the communication electronically, and the informational record specifying a change to be made to the list of recipients specified in the communication previously received by the recipient;

responsive to receiving the informational record, using a message identifier included in the informational record to identify the communication previously received by the recipient; and modifying the identified communication previously received by the recipient, the modifying changing in the communication previously received by the recipient the list of recipients specified in the communication previously received by the recipient, wherein the modifying comprises adding a recipient to the list of recipients, wherein the added recipient receives a further provision of the communication.

11. The computer system of claim 10, wherein the modifying comprises deleting a recipient from the list of recipients.

12. The computer system of claim 10, wherein the modifying comprises moving a recipient from one header field in the communication to another header field in the communication.

13. A computer program product for facilitating modification of communications distributed in a communications environment, the computer program product comprising:

a non-transitory storage medium readable by a processor and storing instructions for execution by the processor for performing a method comprising:

receiving an informational record to be used to modify a communication previously received by a recipient, the communication specifying a list of recipients that were previously sent the communication electronically, and the informational record specifying a change to be made to the list of recipients specified in the communication previously received by the recipient;

responsive to receiving the informational record, using a message identifier included in the informational record to identify the communication previously received by the recipient; and modifying the identified communication previously received by the recipient, the modifying changing in the communication previously received by the recipient the list of recipients specified in the communication previously received by the recipient, wherein the modifying comprises adding a recipient to the list of recipients, wherein the added recipient receives a further provision of the communication.

14. The computer program product of claim 13, wherein the modifying comprises deleting a recipient from the list of recipients.

15. The computer program product of claim 13, wherein the modifying comprises moving a recipient from one header field in the communication to another header field in the communication.

16. The computer program product of claim 13, wherein the informational record includes an X-field that identifies the modification to be performed.

17. The computer program product of claim 13, further comprising notifying one or more recipients of the list of recipients of the modification.

* * * * *